(12) United States Patent
Reishus et al.

(10) Patent No.: US 7,786,626 B2
(45) Date of Patent: Aug. 31, 2010

(54) OSCILLATING MOTOR FOR A PERSONAL CARE APPLIANCE

(75) Inventors: Richard A. Reishus, Renton, WA (US); Stephen M. Meginniss, II, Seattle, WA (US); Kenneth A. Pilcher, Seattke, WA (US)

(73) Assignee: Pacific Bioscience Laboratories, Inc., Bellevue, WA (US)

( * ) Notice: Subject to any disclaimer, the term of this patent is extended or adjusted under 35 U.S.C. 154(b) by 492 days.

(21) Appl. No.: 11/556,282

(22) Filed: Nov. 3, 2006

(65) Prior Publication Data

US 2008/0106156 A1 May 8, 2008

(51) Int. Cl.
*H02K 33/00* (2006.01)
(52) U.S. Cl. .............................. 310/36; 310/15; 15/22.1
(58) Field of Classification Search ............. 310/15–27, 310/36–39; 15/22.1–22.5
See application file for complete search history.

(56) References Cited

U.S. PATENT DOCUMENTS

| | | | |
|---|---|---|---|
| 3,030,967 A | 4/1962 | Peyron | |
| 3,493,793 A * | 2/1970 | Niemela | 310/29 |
| 3,500,080 A * | 3/1970 | Bey | 310/29 |
| 3,699,952 A | 10/1972 | Waters et al. | |
| 4,397,055 A | 8/1983 | Cuchiara | |
| 4,724,563 A | 2/1988 | Fry et al. | |
| 4,919,117 A | 4/1990 | Muchisky et al. | |
| 5,189,751 A * | 3/1993 | Giuliani et al. | 15/22.1 |
| 6,453,498 B1 | 9/2002 | Wu | |
| 6,569,170 B1 | 5/2003 | Kellogg | |
| 6,579,251 B1 | 6/2003 | Randoll | |
| 7,067,945 B2 * | 6/2006 | Grez et al. | 310/50 |
| 7,157,816 B2 * | 1/2007 | Pilcher et al. | 310/36 |
| 2005/0278876 A1 | 12/2005 | Roth et al. | |

* cited by examiner

*Primary Examiner*—Quyen Leung
*Assistant Examiner*—Leda Pham
(74) *Attorney, Agent, or Firm*—Clark A. Puntigam; Jensen & Puntigam, P.S.

(57) ABSTRACT

The motor includes an E-core stator assembly with a source of alternating current and an armature portion mounted to be responsive to the stator to oscillate back and forth through an arc portion of the personal care appliance and flexure elements are connected between the armature and the mounting member, the flexure elements crossing each other, wherein the crossing point defines a pivot point about which the armature rotates. A workpiece assembly, which includes a mounting arm, is configured so that a skin brush mounted on a free end of the mounting arm has an axis of rotation about the pivot point.

11 Claims, 3 Drawing Sheets

OSCILLATING MOTOR FOR A PERSONAL CARE APPLIANCE

TECHNICAL FIELD

This invention relates generally to motors for a personal care appliance, such as a power skin brush, and more specifically concerns an electromagnetic motor using flexure elements to produce an oscillating action of the workpiece portion of the personal care appliance.

BACKGROUND OF THE INVENTION

Personal care appliances typically use an internal motor to produce a particular workpiece movement/action, which in turn produces desired functional results. Examples of such appliances include power skin brushes, power toothbrushes and shavers, among others.

Many such devices have a motor arrangement which produces an oscillating (back and forth) action rather than a purely rotational movement. Such arrangements require not only the typical motor bearing structures for support of the motion, but also specific structural elements to constrain the movement of the motor drive shaft and the workpiece to a selected angle/movement. Such bearings or other elements typically add significant expense and manufacturing difficulties to the manufacture of the appliance as well as reliability/durability concerns to the use of the appliance.

Hence, it is desirable to have a motor for a personal care appliance which produces a desired oscillating action, and which is also rugged, quiet, and does not require bearings or constraining members for operation.

SUMMARY OF THE INVENTION

Accordingly, the invention is a motor for a personal care appliance, comprising: a stator assembly portion driven by a drive assembly which includes a source of alternating current; an armature portion responsive to the stator action to move through a path; a mounting member affixed to a housing portion of the personal care appliance; a flexure assembly connected between the armature and the mounting member, such that the armature in operation moves in an arcuate path about a pivot point located between the mounting member and the armature; and a workpiece assembly mounted to and extending from the armature such that the workpiece oscillates through a desired angle.

BEST MODE FOR CARRYING OUT THE INVENTION

Figure 1:
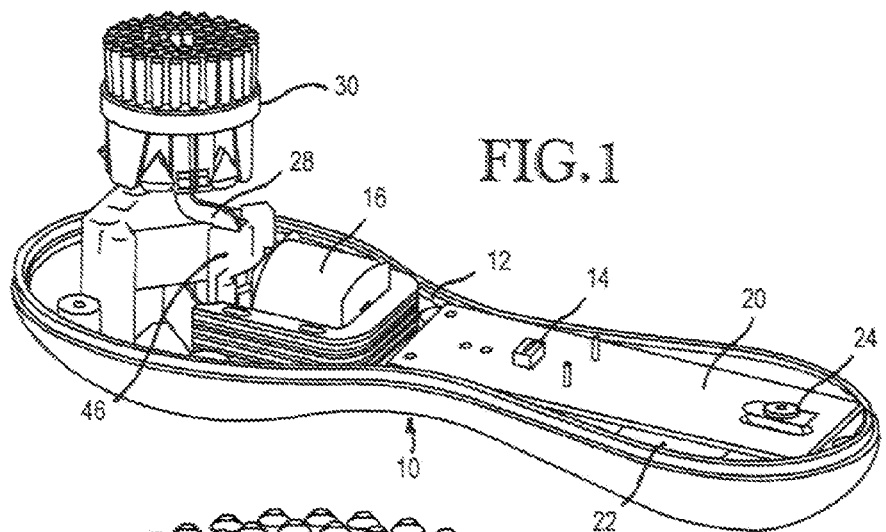
FIG. 1 is a partial perspective view of a person care skin brush appliance incorporating the appliance motor of the present invention.

FIG. 1 shows a personal care appliance in the form of a power skin brush. The personal care appliance 10 includes a case or housing 12 through which an on/off switch 14 extends to contact a button on the case or the like for control of the appliance. Positioned within case 12 is a motor 16 and a drive assembly, which includes an electronic drive circuit 20 and rechargeable batteries 22 which provide a self-contained source of power for the appliance. The appliance 10 in the embodiment shown also includes a charging coil 24 which operates with a conventional charger (not shown) to maintain batteries 22 in a charged condition.

The appliance further includes a workpiece mounting arm 28 which extends from an armature portion of the motor 16. Mounted on the free end of arm 28 is a specific workpiece 30, which in the embodiment shown is a skin brush. Such a skin brush is shown and described in more detail in co-pending application Ser. No. 10/873,352, which is owned by the assignee of the present invention, the contents of which is hereby incorporated by reference. However, the workpiece 30 can take various forms, including, for example, a toothbrush brushhead or a shaving head. In operation, the workpiece will oscillate back and forth through a desired angle due to the action of the motor 16. Typically, but not necessarily, the oscillation will be rotational. The movement may also include a translational component as well, as discussed below.

Figure 2:
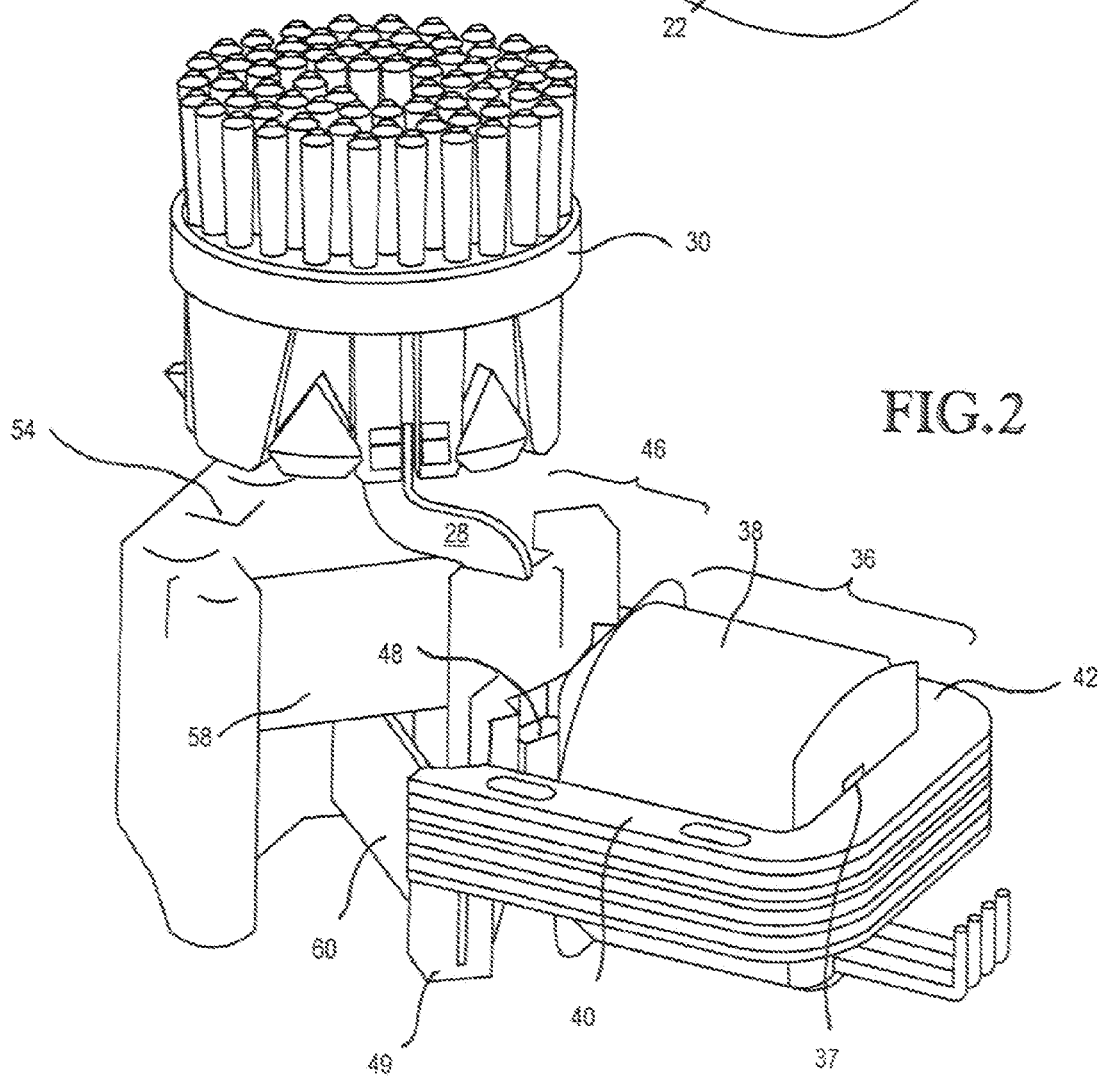
FIG. 2 is a perspective view of the appliance motor of FIG. 1.
Figure 3:
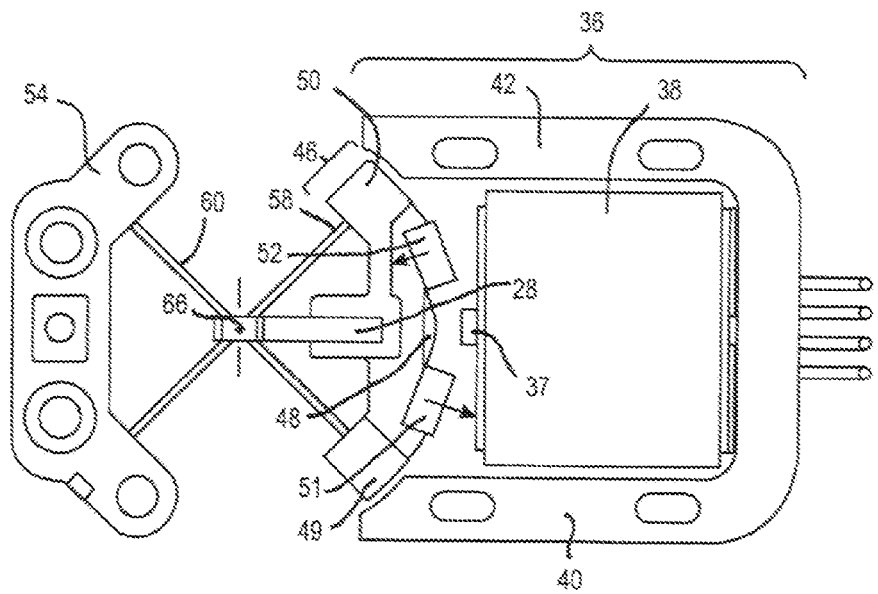
FIG. 3 is a top view of the motor of FIGS. 1 and 2.

FIGS. 2 and 3 show the motor 16 in more detail. The motor includes a stator portion 36, which in the embodiment shown is an E-core with a center leg 37 upon which a stator coil 38 is mounted and two outer legs 40 and 42. An armature portion 46 of the motor 16 has a curved configuration with tip ends 49 and 50 which come closely adjacent the curved tip ends of outer legs 40 and 42 of the stator E-core. The armature portion 46 includes a backiron member 48 which is made from a ferromagnetic material. Two or more spaced magnets 51 and 52 are mounted on the backiron, with magnetization in the radial direction, arranged such that the north pole of one magnet 51 faces outward, although it should be understood that the orientation could be reversed as long as the magnet poles point in opposite directions. The motor 16 also includes a mounting element 54 which is secured to the case 12 of the appliance, thus becoming a mechanical reference for the oscillating system.

Connecting the armature 46 to the mounting element 54 are a pair of fixture elements, in this embodiment flexure elements 58 and 60, although additional flexure elements can be used. In one example, the flexure elements are made from spring steel material, and are approximately 0.025 inch thick. Each flexure element is approximately 0.50 inch high. Flexure elements 58 and 60 are oriented approximately perpendicular to each other. The point of overlap between the flexure elements 58 and 60 is the functional pivot point 66 about which armature 46 oscillates.

Extending from the armature 46 is the mounting arm 28. As can be seen most clearly in FIG. 2, mounting arm 28 extends outwardly form the armature and then extends horizontally (parallel with the handle of the appliance) until it reaches a line extending through pivot point 66, where the mounting arm extends outwardly again approximately at a right angle to the handle. Mounted on the free end of mounting arm 28 is workpiece 30, which, for example, is a skin brush, as indicated above. The configuration of the mounting arm is thus such that the brush oscillates about an axis which extends through pivot point 66 at a right angle to the handle. The location/orientation of the output shaft can be changed, for instance by moving the location of the tip away from axis 66, to produce a combined rotational/translational movement of the workpiece.

Figure 4:
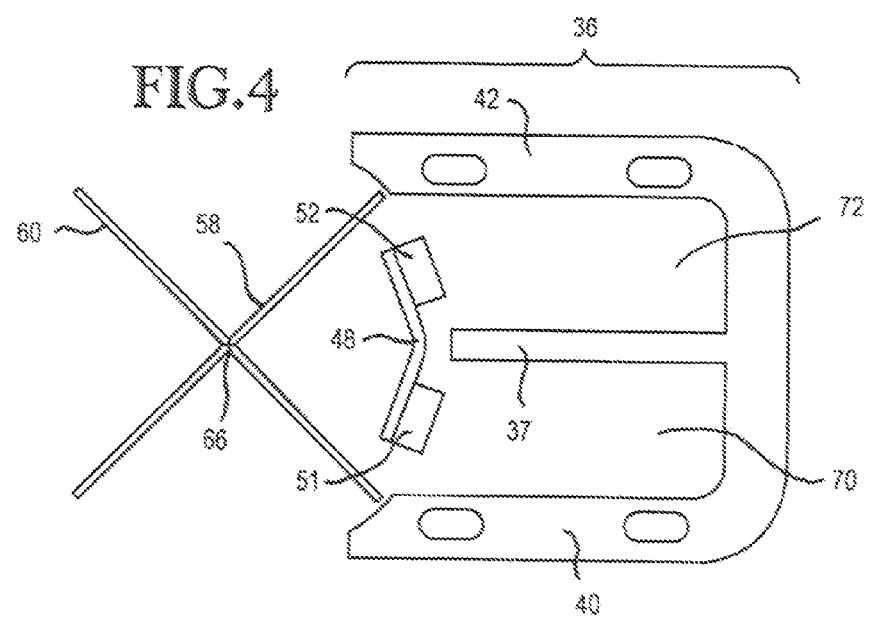
FIG. 4 is a top view of the motor of FIGS. 1 and 2 with selected portions thereof removed.
Figure 5:
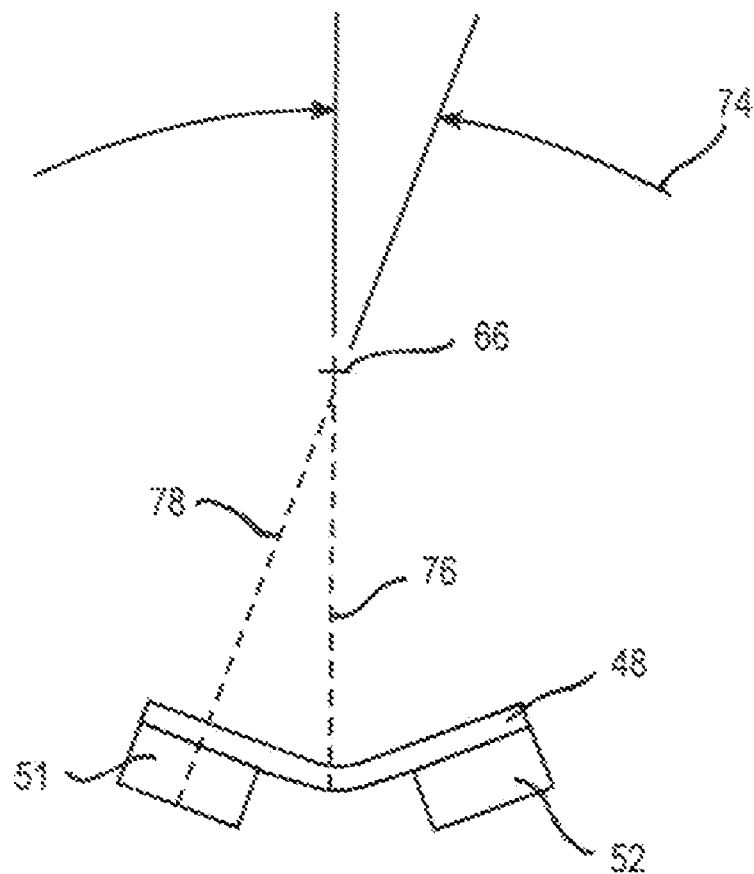
FIG. 5 is a top view of the motor of FIGS. 1 and 2 showing only the magnets and backiron portions thereof.

Referring to FIG. 4, the E-core 36, backiron 48, magnets 52, 52 and flexure elements 58, 60 are shown alone for clarity. The geometry of the E-core in relation to the width of the face of magnets 51, 52 is important for maximum efficiency of the motor. Specifically, the width of the E-core center leg 37 should be from 0.50 to 0.60 (preferably 0.56) times the width of the face of the magnets. The width of the outer legs 40, 42 should be from 0.90 to 1.10 (preferably 1.02) times the width of the face of the magnets. The width of the distances 70, 72 between center leg 37 and outer legs 40, 42, respectively, should be from 1.95 to 2.20 (preferably 2.07) times the width of the face of the magnets. The length of center leg 37 should be from 1.95 to 2.15 (preferably 2.06) time the width of distances 70, 72.

Further, the distance between the centers of the faces of magnets 51, 52 should be from 2.40 to 2.60 (preferably 2.49) times the width of the face of the magnets. It is also advantageous to motor efficiency to set magnets 51, 52 at an angle with respect to each other such that a line normal to the face of the magnets, passing through the midpoint of the magnet face also passes through the pivot axis of the armature. In the embodiment shown, the angle 74 between the midpoint line 76 and the line 78 normal to the magnet face (both passing through pivot axis 66) is from 18° to 22° (preferably 20°). It should be noted that this angle can vary depending on the radius at which the magnets rotate about the pivot axis. As the radius increases, the angle decreases.

In operation, an alternating current is generated by the electronic current assembly and applied to the stator coil 36, resulting in an arcuate movement of the armature about the pivot point 66, due to the attractive/repulsive action between the three legs 37, 40, 42 of the stator E-coil and permanent magnets 51, 52 on the backiron 48. The particular arrangement of the stator E-coil and the armature results in a substantially rotational oscillation of a selected angle about the pivot axis 66. The instantaneous center of rotation moves in a very small (approximately 0.010 inches) complex curve offset about the shaft center point when it is at rest. The angular range of oscillation can be varied, depending upon the configuration of the armature and the stator and the characteristics of the alternating drive current. Preferably, the motion is within the range ±3° to ±15° about the pivot axis.

The flexure elements, with their configuration and aspect, ratio, connected between the armature and the mounting member, constrain the movement of the armature to substantially rotational action about a line generally passing through the pivot axis, eliminating the need for bearings and other elements to constrain the oscillating movement of the workpiece.

The arrangement shown and described above is for a device where the axis of rotation of the motor shaft, and hence the brush, is at a right angle to the longitudinal axis of the handle portion of the device. In another arrangement, the magnets on the backiron portion of the armature may be affixed to the side of the armature away from the workpiece, with a magnetization arrangement/orientation parallel to the axis of rotation and with the stator assembly arranged in line with the axis of rotation, rather than the radial magnetization, right angle axis of rotation arrangement discussed above. This axial arrangement is suitable for a device having a desired axis of rotation of the motor drive shaft substantially parallel to the longitudinal axis of the handle portion of the device.

Hence, a new motor arrangement for a personal care appliance has been disclosed which produces an oscillation over a defined angle without the need for bearings or other special constraining elements.

Although a preferred embodiment of the invention has been disclosed for purposes of illustration, it should be understood that various changes, modifications and substitutions may be incorporated in the embodiment without departing from the spirit of the invention which is defined by the claims which follow.

What is claimed is:

1. A motor for a personal care appliance, comprising:
    a stator assembly portion driven by a drive assembly which includes a source of alternating current;
    an armature portion responsive to the stator action to move through a path;
    a mounting member affixed to a housing portion of the personal care appliance;
    a flexure assembly connected between the armature and the mounting member, such that the armature in operation moves in an arcuate path about a pivot point located apart from and between the mounting member and the armature; and
    a workpiece assembly mounted to and extending from the armature but not connected directly to the pivot point, such that the workpiece oscillates through a desired angle.

2. The motor of claim 1, wherein the desired angle is approximately within the range of +3° to +15°.

3. The motor of claim 1, wherein the flexure assembly includes at least two separate flexure members which cross each other between the mounting member and the armature at a point removed from both the mounting member and the armature, wherein the armature moves about a pivot point approximately where the flexure members cross.

4. The motor of claim 1, wherein the workpiece is a skin brush.

5. The motor of claim 1, wherein the workpiece assembly includes a mounting arm which is mounted to and extends from the armature, and wherein the workpiece is mounted upon a free end of the mounting arm.

6. The motor of claim 1, wherein the mounting arm and the armature are arranged so that the workpiece rotates about an axis approximately at right angles to the longitudinal axis of the appliance.

7. The motor of claim 1, wherein the mounting arm and the armature are arranged so that the workpiece rotates about an axis which is approximately parallel to the longitudinal axis of the appliance.

8. The motor of claim 1, wherein the stator portion includes an E-core member having a center leg and two outer legs, wherein the armature portion includes a backiron which has two spaced magnets mounted thereon with the magnetic poles thereof aligned in opposing directions, and wherein the width of the center leg of the E-core member is approximately 0.50-0.60 times the width of the faces of the magnets, the width of the outer legs is approximately 0.90-1.10 times the width of the faces of the magnets, the width of the distance between the center leg and the two outer legs, respectively, is 1.95-2.20 times the width of the magnet face and the length of the center leg is 1.95-2.15 times the width of said distance between the center leg and the two outer legs.

9. The motor of claim 8, wherein the distance between the centers of the magnets is 2.40-2.60 times the width of the faces of the magnets and wherein the magnets are positioned at an angle in the range of 18-22° relative to a line passing through a midpoint of the backiron and said pivot point.

10. A personal care appliance, comprising:
    an appliance housing;
    a drive assembly which includes a source of alternating current;
    a motor which includes a stator assembly portion driven by the alternating current and an armature portion responsive to the stator action to move through a path;

a mounting assembly affixed to the housing;

a flexure assembly connected between the armature and the mounting member, such that the armature moves in an arcuate path about a pivot point located apart from and between the mounting member and the armature; and a workpiece assembly which includes a mounting arm mounted to and extending from the armature and a skin brush mounted on a free end of the mounting member, wherein the workpiece assembly is not connected directly to the pivot point and wherein the mounting arm is configured such that the workpiece oscillates about the pivot point through a desired angle.

11. The appliance of claim 8, wherein the desired angle of oscillation of the workpiece is approximately within the range of +3° to +15°.

\* \* \* \* \*